United States Patent
Gao et al.

(10) Patent No.: US 9,356,669 B2
(45) Date of Patent: May 31, 2016

(54) METHOD, SYSTEM AND DEVICE FOR TRANSMITTING PRE-CODED INDICATION INFORMATION AND DETERMINING PRE-CODING MATRIX

(71) Applicant: China Academy of Telecommunications Technology, Beijing (CN)

(72) Inventors: Qiubin Gao, Beijing (CN); Rakesh Tamrakar, Beijing (CN); Xin Su, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/434,396

(22) PCT Filed: Oct. 30, 2013

(86) PCT No.: PCT/CN2013/086240
§ 371 (c)(1),
(2) Date: Apr. 8, 2015

(87) PCT Pub. No.: WO2014/067461
PCT Pub. Date: May 8, 2014

(65) Prior Publication Data
US 2015/0280798 A1    Oct. 1, 2015

(30) Foreign Application Priority Data
Oct. 29, 2012   (CN) .......................... 2012 1 0422345

(51) Int. Cl.
*H04B 15/00*    (2006.01)
*H04B 7/04*    (2006.01)
(Continued)

(52) U.S. Cl.
CPC ............ *H04B 7/0456* (2013.01); *H04B 7/0469* (2013.01); *H04B 7/0478* (2013.01); *H04L 5/14* (2013.01); *H04W 16/28* (2013.01)

(58) Field of Classification Search
CPC ................ H03F 1/3247; H03F 1/3294; H03F 2201/3233; H04L 27/368; H04L 25/03343; H04L 27/2647; H04L 1/20; H04L 25/497; H04L 25/03057; H04B 1/1027; H04B 1/123; H04B 1/1036; H04B 3/32; H04B 3/23

USPC ................ 375/219–222, 229–232, 259–285, 375/295–352
See application file for complete search history.

(56) References Cited

U.S. PATENT DOCUMENTS

2004/0002364 A1* 1/2004 Trikkonen et al. ......... 455/562.1
2005/0078761 A1* 4/2005 Hottinen et al. ............... 375/267
(Continued)

FOREIGN PATENT DOCUMENTS

CN    102130752 A    7/2011
CN    102217206 A    10/2011
(Continued)

OTHER PUBLICATIONS

International Search Report for PCT/CN2013/086240.
(Continued)

*Primary Examiner* — James M Perez
(74) *Attorney, Agent, or Firm* — Kilpatrick Townsend & Stockton LLP

(57) ABSTRACT

An embodiment of the present application relates to the technical field of wireless communications, in particular to a method, system and device for transmitting pre-coded indication information and determining a pre-coding matrix. In the prior art, the existing codebook is designed for horizontal beamforming/pre-coding, and will reduce the performance thereof if directly applied in three-dimensional beamforming/pre-coding technique. The present application solves the problem. The method in the embodiment of the present application comprises: a user equipment (UE) determines and transmits first pre-coded indication information and second pre-coding indication information, the pre-coding matrix being equal to the function matrix of a first component pre-coding matrix and a second component pre-coding matrix, a sub-matrix on the diagonal of the first component pre-coding matrix being the Kronecker product of two diagonal matrixes, the second component pre-coding matrix being formed by a beam rotation vector equaling to the Kronecker product of two vectors. The embodiment of the present application improves the performance of the three-dimensional beamforming/pre-coding technique.

20 Claims, 4 Drawing Sheets

(51) Int. Cl.
    *H04L 5/14*    (2006.01)
    *H04W 16/28*   (2009.01)

(56) References Cited

U.S. PATENT DOCUMENTS

| | | | |
|---|---|---|---|
| 2006/0078063 A1* | 4/2006 | Hottinen | 375/267 |
| 2007/0058746 A1* | 3/2007 | Gueguen | 375/267 |
| 2008/0240274 A1* | 10/2008 | Han et al. | 375/260 |
| 2009/0195453 A1* | 8/2009 | Kim | H04L 25/03343 342/373 |
| 2010/0034308 A1* | 2/2010 | Kim | H04B 7/0617 375/267 |
| 2010/0045494 A1 | 2/2010 | Clerckx et al. | |
| 2011/0080969 A1* | 4/2011 | Jongren et al. | 375/267 |
| 2011/0085610 A1* | 4/2011 | Zhuang et al. | 375/260 |
| 2011/0170638 A1* | 7/2011 | Yuan | H04B 7/0626 375/340 |
| 2011/0268207 A1* | 11/2011 | Choi et al. | 375/267 |
| 2011/0274188 A1* | 11/2011 | Sayana | H04B 7/0639 375/260 |
| 2011/0274200 A1* | 11/2011 | Lee et al. | 375/295 |
| 2011/0305263 A1 | 12/2011 | Jongren et al. | |
| 2012/0177097 A1 | 7/2012 | Lee et al. | |
| 2012/0230380 A1* | 9/2012 | Keusgen et al. | 375/227 |
| 2012/0269290 A1 | 10/2012 | Onggosanusi et al. | |
| 2013/0034179 A1* | 2/2013 | Zhang et al. | 375/267 |
| 2014/0177683 A1* | 6/2014 | Krishnamurthy | H04B 7/0469 375/219 |
| 2014/0177744 A1* | 6/2014 | Krishnamurthy | H04B 7/0469 375/267 |
| 2014/0241450 A1* | 8/2014 | Prasad et al. | 375/267 |
| 2015/0270881 A1* | 9/2015 | Gao | 370/546 |

FOREIGN PATENT DOCUMENTS

| | | |
|---|---|---|
| CN | 102668434 A | 9/2012 |
| WO | 2008/147855 A1 | 12/2008 |

OTHER PUBLICATIONS

The Extended European Search Report issued on Sep. 4, 2015 in the EP counterpart application (13851271.0).

* cited by examiner

METHOD, SYSTEM AND DEVICE FOR TRANSMITTING PRE-CODED INDICATION INFORMATION AND DETERMINING PRE-CODING MATRIX

This application is a US National Stage of International Application No. PCT/CN2013/086240, filed on Oct. 30, 2013, designating the United States and claiming priority to Chinese Patent Application No. 201210422345.7, filed with the Chinese Patent Office on Oct. 29, 2012 and entitled "Method, system and device for transmitting a coding indicator and determining a pre-coding matrix", which is hereby incorporated by reference in its entirety.

FIELD

The present invention relates to the field of wireless communications and particularly to a method, system and device for transmitting a coding indicator and determining a pre-coding matrix.

BACKGROUND

Closed-loop pre-coding has been introduced in the Long Term Evolution (LTE) Release 8 (Rel-8) to improve the spectrum efficiency. Closed-loop pre-coding essentially requires the same set of pre-coding matrixes, referred to as a codebook, to be stored at both an evolved Node B (eNB) and a User Equipment (UE). The UE estimates channel information from a cell common pilot and then selects a pre-coding matrix from the codebook according to some criterion which can be the maximizing mutual information, the maximizing output signal to interference and noise ratio, etc. The UE feeds back an index of the selected pre-coding matrix in the codebook to the eNB over an uplink channel, and the index is referred to as a Pre-coding Matrix indicator (PMI). The eNB can determine, from the value of the received index, the pre-coding matrix to be used for the UE. The pre-coding matrix reported by the UE can be considered as a quantized value of channel state information.

In an existing cellular system, an array of antennas of an eNB is typically arranged horizontally as illustrated in FIG. 1 and FIG. 2. A beam at a transmitting end, the eNB, can be adjusted only horizontally with a common vertical down tilt angle for every UE, so various beam-forming/pre-coding technologies are generally applied based upon channel information in horizontal dimension. In fact, a radio signal propagates in three dimensions in space, and the performance of the system may not be optimized with this common vertical down tilt angle. Adjusting of the beam in vertical direction may be of great significance to the improved performance of the system. Along with the development of antenna technologies, an array of active antennas with each array element being separately controllable has emerged in the industry as illustrated in FIG. 3A and FIG. 3B. Dynamic adjusting of a beam in vertical dimension becomes possible with this array of antennas. 3D beam-forming/pre-coding may be performed in a Frequency Division Duplex (FDD) system based upon channel state information reported by a UE, possibly using a codebook as conventionally used in the LTE Rel-8 system. However the existing codebook is designed for horizontal beam-forming/pre-coding, so a direct application thereof to 3D beam-forming/pre-coding may degrade the performance.

In summary, the existing codebook is designed for horizontal beam-forming/pre-coding, so a direct application thereof to 3D beam-forming/pre-coding may degrade the performance.

SUMMARY

Embodiments of the invention provide a method, system and device for transmitting a pre-coding indicator and determining a pre-coding matrix so as to address such a problem in the prior art that the existing codebook is designed for horizontal beam-forming/pre-coding, so a direct application of the existing codebook to 3D beam-forming/pre-coding may degrade the performance.

An embodiment of the invention provides a method for transmitting a pre-coding indicator, the method including:

determining, by a UE, a first pre-coding indicator and a second pre-coding indicator, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and transmitting, by the UE, the first pre-coding indicator and the second pre-coding indicator to the network side.

An embodiment of the invention provides a method for determining a pre-coding matrix, the method including:

receiving, by a network-side device, a first pre-coding indicator and a second pre-coding indicator from a UE; and determining, by the network-side device, a pre-coding matrix corresponding to the first pre-coding indicator and the second pre-coding indicator, wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

An embodiment of the invention provides a UE for transmitting a pre-coding indicator, the UE including:

a first determining module configured to determine a first pre-coding indicator and a second pre-coding indicator, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and a transmitting module configured to transmit the first pre-coding indicator and the second pre-coding indicator to the network side.

An embodiment of the invention provides a UE including a processor and a data transceiving interface, wherein:

the processor is configured to determine a first pre-coding indicator and a second pre-coding indicator, where the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and to transmit the first pre-coding indicator and the second pre-coding indicator to the network side; and the data transceiving interface is configured to communicate data with the network-side device.

An embodiment of the invention provides a network-side device for determining a pre-coding matrix, the network-side device including:

a receiving module configured to receive a first pre-coding indicator and a second pre-coding indicator from a UE; and a second determining module configured to determine a pre-coding matrix corresponding to the first pre-coding indicator and the second pre-coding indicator, wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

An embodiment of the invention provides a network-side device including a processor and a data transceiving interface, wherein:

the processor is configured to receive a first pre-coding indicator and a second pre-coding indicator from a UE; and to determine a pre-coding matrix corresponding to the first pre-coding indicator and the second pre-coding indicator, wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

the data transceiving interface is configured to communicate data with the UE.

An embodiment of the invention provides a system for determining a pre-coding matrix, the system including:

a UE configured to determine a first pre-coding indicator and a second pre-coding indicator, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and a network side device configured to receive the first pre-coding indicator and the second pre-coding indicator from the UE; and to determine the pre-coding matrix corresponding the first pre-coding indicator and the second pre-coding indicator.

In the embodiments of the invention, the UE determines the first pre-coding indicator and the second pre-coding indicator, wherein the first pre-coding indicator and the second pre-coding indicator correspond to the pre-coding matrix which is equal to a matrix as a function of the first component pre-coding matrix and the second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors. The pre-coding matrix can be constructed to better match a space channel of 3D beam-forming to thereby improve the performance of 3D beam-forming/pre-coding.

DETAILED DESCRIPTION OF THE EMBODIMENTS

In the embodiments of the invention, a UE determines a first pre-coding indicator and a second pre-coding indicator, and the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by of beam-rotating vectors, each of the beam-rotating vectors is equal to a Kronecker product of two vectors. The pre-coding matrix can be constructed to better match a space channel of 3D beam-forming to thereby improve the performance of 3D beam-forming/pre-coding.

The embodiments of the invention will be described below in further details with reference to the drawings.

In the following description, firstly an implementation with cooperation of the network side and the UE side will be described, and then implementations at the network side and the user equipment side will be described respectively, but this will not suggest required cooperation of both the sides for an implementation. In fact, problems encountered respectively at the network side and the user equipment side will also be addressed in the separate implementations at the network side and the user equipment side, although a better technical effect can be achieved in the implementation with cooperation of both the sides.

Figure 1:
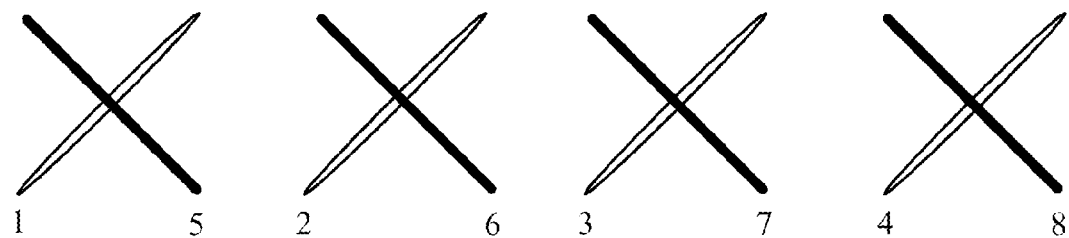
FIG. 1 illustrates a schematic diagram of horizontally arranged dual-polarized antennas in the prior art.
Figure 2:
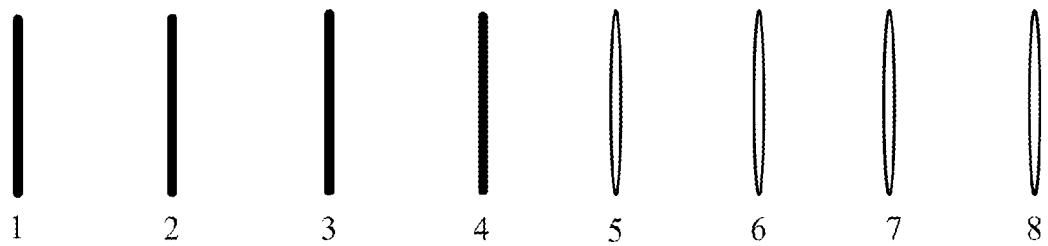
FIG. 2 illustrates a schematic diagram of horizontally arranged linear-array antennas in the prior art.
Figure 3A:
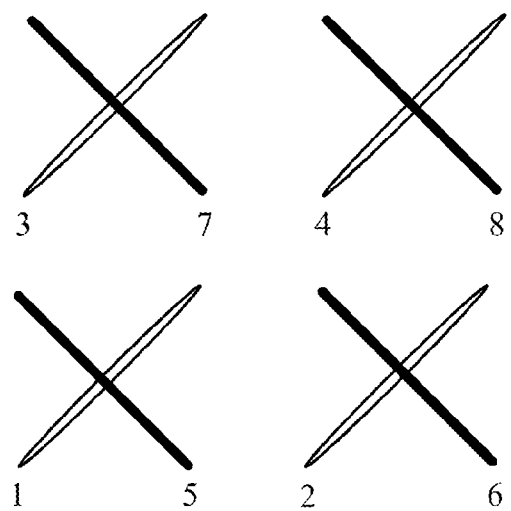
FIG. 3A illustrates a schematic diagram of horizontally 2D-arranged dual-polarized antennas in the prior art.
Figure 3B:
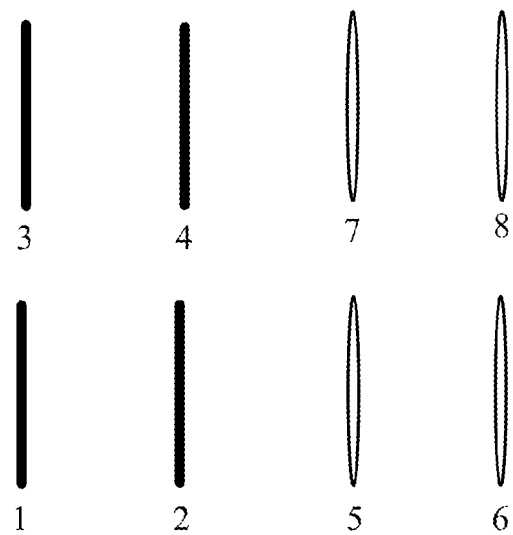
FIG. 3B illustrates a schematic diagram of vertically 2D-arranged linear-array antennas in the prior art.
Figure 4:
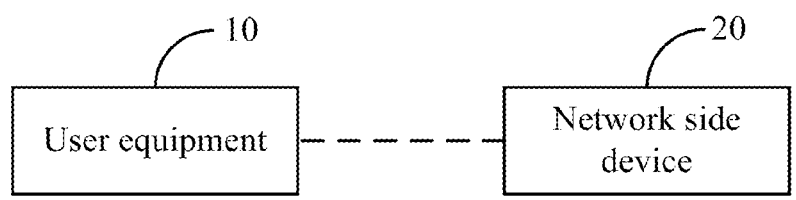
FIG. 4 illustrates a schematic structural diagram of a system for determining a pre-coding matrix according to an embodiment of the invention.

As illustrated in FIG. 4, a system for determining a pre-coding matrix according to an embodiment of the invention includes a UE 10 and a network side device 20.

The UE 10 is configured to determine a first pre-coding indicator and a second pre-coding indicator and to transmit the first pre-coding indicator and the second pre-coding indicator to the network side, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and The network side device 20 is configured to receive the first pre-coding indicator and the second pre-coding indicator from the UE; and to determine the pre-coding matrix according to the first pre-coding indicator and the second pre-coding indicator.

In an implementation, the UE 10 can determine the first pre-coding indicator and the second pre-coding indicator in a number of approaches, several of which will be listed below:

First approach, the UE 10 selects the first component pre-coding matrix from a set of first component pre-coding matrixes and determines the first pre-coding indicator corresponding to the selected first component pre-coding matrix, and selects the second component pre-coding matrix from a set of second component pre-coding matrixes and determines the second pre-coding indicator corresponding to the selected second component pre-coding matrix.

Particularly the UE 10 estimates a channel of each antenna port to the UE 10 according to a pilot symbol transmitted by the network-side device 20, each antenna port corresponds to one or more physical antennas; and Then the UE 10 selects the first component pre-coding matrix from the set of first component pre-coding matrixes, and selects the second component pre-coding matrix from the set of second component pre-coding matrixes, according to the estimated channel.

The first component pre-coding matrix can be determined by maximizing a mutual information or maximizing an output signal to interference and noise ratio or maximizing an output energy. The first component pre-coding matrix can be determined by maximizing an output energy in the equation of:

$$W_1 = \underset{V \in C_1}{\operatorname{argmax}} \|H_1 V\|^2,$$

$C_1$ represents a set of possible first component pre-coding matrixes, and $H_1$ represents a part of a channel matrix of the network-side device 20 to the UE 10, particularly a part thereof corresponding to the first component pre-coding matrix, e.g., channels of dual-polarized antennas in the same polarization or channels of a half of antennas in an array of co-polarized antennas.

The second component pre-coding matrix can be determined by maximizing a mutual information or maximizing an output signal to interference and noise ratio or maximizing an output energy. The second component pre-coding matrix can be determined by maximizing an output energy in the equation of:

$$W_2 = \underset{V \in C_2}{\operatorname{argmax}} \|HW_1 V\|^2,$$

$C_2$ represents a set of possible second component pre-coding matrixes, H represents the channel matrix of the network-side device 20 to the UE 10, and $W_1$ represents the determined first component pre-coding matrix.

In the first approach, the UE 10 can transmit the first pre-coding indicator and the second pre-coding indicator to the network-side device 20 over an uplink channel at different time with different time granularities and frequency granularities or at the same time.

In an implementation, the first component pre-coding matrix in the embodiment of the invention is a block diagonal matrix, and the first component pre-coding matrix is expressed in one of Equation 1 to Equation 4 below:

$$W_1 = \begin{bmatrix} \operatorname{diag}(U_V) \otimes \operatorname{diag}(U_H) & 0 \\ 0 & \operatorname{diag}(U_V) \otimes \operatorname{diag}(U_H) \end{bmatrix}; \quad \text{Equation 1}$$

$$W_1 = \begin{bmatrix} \operatorname{diag}(U_V) \otimes \operatorname{diag}(U_H) & 0 \\ 0 & \operatorname{diag}(U_V) \otimes \operatorname{diag}(AU_H) \end{bmatrix}; \quad \text{Equation 2}$$

$$W_1 = \begin{bmatrix} \operatorname{diag}(U_V) \otimes \operatorname{diag}(U_H) & 0 \\ 0 & \operatorname{diag}(BU_V) \otimes \operatorname{diag}(U_H) \end{bmatrix}; \text{ and} \quad \text{Equation 3}$$

$$W_1 = \begin{bmatrix} \operatorname{diag}(U_V) \otimes \operatorname{diag}(U_H) & 0 \\ 0 & \operatorname{diag}(BU_V) \otimes \operatorname{diag}(AU_H) \end{bmatrix}. \quad \text{Equation 4}$$

$W_1$ represents the first component pre-coding matrix; $U_H$ represents a beam-forming vector with $D_H \times 1$ dimension; $U_V$ represents a beam-forming vector with $D_V \times 1$ dimension; A represents a diagonal matrix with $D_H \times D_H$ dimension, the values of which can be a function of $U_H$ or fixed values; B represents a diagonal matrix with $D_V \times D_V$ dimension, the values of which can be a function of $U_V$ or fixed values, $D_H$ and $D_V$ represent positive integers; and diag(U) represents a diagonal matrix, derived from a vector U, with elements on the diagonal being equal to elements in the vector U.

Preferably $D_H$ is a half of the number of horizontal antennas.

Equation 1 to Equation 4 can be further transformed into the following equations:

$$W_1 = \begin{bmatrix} \operatorname{diag}(U_V \otimes U_H) & 0 \\ 0 & \operatorname{diag}(U_V \otimes U_H) \end{bmatrix}; \quad \text{Equation 1'}$$

$$W_1 = \begin{bmatrix} \operatorname{diag}(U_V \otimes U_H) & 0 \\ 0 & \operatorname{diag}(U_V \otimes (AU_H)) \end{bmatrix}; \quad \text{Equation 2'}$$

$$W_1 = \begin{bmatrix} \operatorname{diag}(U_V \otimes U_H) & 0 \\ 0 & \operatorname{diag}((BU_V) \otimes U_H) \end{bmatrix}; \text{ and} \quad \text{Equation 3'}$$

$$W_1 = \begin{bmatrix} \operatorname{diag}(U_V \otimes U_H) & 0 \\ 0 & \operatorname{diag}((BU_V) \otimes (AU_H)) \end{bmatrix}. \quad \text{Equation 4'}$$

In the first approach, the set of first component pre-coding matrixes is composed of first component pre-coding matrixes expressed in one of Equation 1 to Equation 4 above.

Preferably $U_H$ represents an element in a set of beamforming vectors $\{U_{H,p}: p=0, 1, \ldots, N_H-1\}$ with $U_H=U_{H,k}$ and $0 \leq k \leq N_H-1$, $N_H$ represents a positive integer; or $U_H$ represents a vector in a Grassmanian codebook, the Grassmanian codebook is a set of vectors or matrixes, the minimum one of the distances between any two elements in the set is maximized.

Preferably $U_H$ is taken from a predefined set of vectors $\{U_{H,p}: p=0, 1, \ldots, N_H-1\}$. $U_{H,k}$ ($0 \leq k \leq N_H-1$) can represent a Discrete Fourier Transform (DFT) vector or a part of the DFT vector, e.g., first $D_H$ rows in an L-point DFT vector, i.e., $$[U_{H,k}]_i = e^{j\frac{2\pi i k}{L}} \text{ or } [U_{H,k}]_i = e^{-j\frac{2\pi i k}{L}}$$

with $i=0, 1, \ldots, D_H-1$, and $[U_{H,k}]_i$ represents the i-th element in the vector $U_{H,k}$, and this will apply hereinafter. Preferably $L=N_H$. If the value of A is a function of $U_H$, and $A_k$ depends on $U_{H,k}$, then $$[A_k]_{ii} = e^{j\frac{2\pi k D_H}{L}} \text{ or } [A_k]_{ii} = e^{-j\frac{2\pi k D_H}{L}}.$$

$U_{H,k}$ can alternatively represent a vector in a Grassmanian codebook, the Grassmanian codebook is a set of vectors or matrixes, and elements in the set are selected so that the minimum one of the distances between any two elements in the set is maximized. Particularly $\{U_{H,p}: p=0, 1, \ldots, N_H-1\}$ represents a Grassmanian codebook with a number $N_H$ of elements in a $D_H$-dimension vector space.

The elements in $\{U_{H,p}: p=0, 1, \ldots, N_H-1\}$ can include both DFT vector and Grassmanian vector, for example, one half of the elements are DFT vectors, and the other half thereof are taken from the Grassmanian codebook.

Preferably $U_V$ represents an element in a set of beamforming vectors $\{U_{V,q}: q=0, 1, \ldots, N_V-1\}$ with $U_V=U_{V,n}$ and $0 \leq n \leq N_V-1$, $N_V$ represents a positive integer; or $U_V$ represents a vector in a Grassmanian codebook, the Grassmanian codebook is a set of vectors or matrixes, the minimum one of the distances between any two elements in the set is maximized.

Preferably $U_V$ is taken from a predefined set of vectors $\{U_{V,q}: q=0, 1, \ldots, N_V-1\}$. $U_{V,n}$ ($0 \leq n \leq N_V-1$) can represent a DFT vector or a part of the DFT vector, e.g., first $D_V$ rows in an L-point DFT vector, i.e., $$[U_{V,n}]_i = e^{j\frac{2\pi i n}{L}} \text{ or } [U_{V,n}]_i = e^{-j\frac{2\pi i n}{L}}$$

with $i=0, 1, \ldots, D_V-1$. Preferably $L=N_V$. If the value of B is a function of $U_V$, and $B_n$ depends on $U_{V,n}$, then $$[B_n]_{ii} = e^{j\frac{2\pi n D_V}{L}} \text{ or } [B_n]_{ii} = e^{-j\frac{2\pi n D_V}{L}}.$$

$U_{V,n}$ can alternatively represent a vector in a Grassmanian codebook which is a set of vectors or matrixes, elements in the set are selected so that the minimum one of the distances between any two elements in the set is maximized. Particularly $\{U_{V,q}: q=0, 1, \ldots, N_V-1\}$ represents a Grassmanian codebook with a number $N_V$ of elements in a $D_V$-dimension vector space.

The elements in $\{U_{V,q}: q=0, 1, \ldots, N_V-1\}$ can include both DFT vector and Grassmanian vector, for example, one half of the elements are DFT vectors, and the other half thereof are taken from the Grassmanian codebook.

Preferably the first component pre-coding matrix $W_1$ is taken from the set (or from a subset thereof):

$$\left\{\begin{bmatrix} \text{diag}(U_{V,n} \otimes U_{H,k}) & 0 \\ 0 & \text{diag}(U_{V,n} \otimes U_{H,k}) \end{bmatrix}\right. :$$
$$k = 0, 1, \ldots, N_H-1; n = 0, 1, \ldots, N_V-1 \Big\}; \text{ or}$$

$$\left\{\begin{bmatrix} \text{diag}(U_{V,n} \otimes U_{H,k}) & 0 \\ 0 & \text{diag}(U_{V,n} \otimes (A_k U_{H,k})) \end{bmatrix}\right. :$$
$$k = 0, 1, \ldots, N_H-1; n = 0, 1, \ldots, N_V-1 \Big\}; \text{ or}$$

$$\left\{\begin{bmatrix} \text{diag}(U_{V,n} \otimes U_{H,k}) & 0 \\ 0 & \text{diag}((B_n U_{V,n}) \otimes U_{H,k}) \end{bmatrix}\right. :$$
$$k = 0, 1, \ldots, N_H-1; n = 0, 1, \ldots, N_V-1 \Big\}; \text{ or}$$

$$\left\{\begin{bmatrix} \text{diag}(U_{V,n} \otimes U_{H,k}) & 0 \\ 0 & \text{diag}((B_n U_{V,n}) \otimes (A_k U_{H,k})) \end{bmatrix}\right. :$$
$$k = 0, 1, \ldots, N_H-1; n = 0, 1, \ldots, N_V-1 \Big\}; \text{ or}$$

$$\left\{\begin{bmatrix} \text{diag}(U_{V,n}) \otimes \text{diag}(U_{H,k}) & 0 \\ 0 & \text{diag}(U_{V,n}) \otimes \text{diag}(U_{H,k}) \end{bmatrix}\right. :$$
$$k = 0, 1, \ldots, N_H-1; n = 0, 1, \ldots, N_V-1 \Big\}; \text{ or}$$

$$\left\{\begin{bmatrix} \text{diag}(U_{V,n}) \otimes \text{diag}(U_{H,k}) & 0 \\ 0 & \text{diag}(U_{V,n}) \otimes \text{diag}(A_k U_{H,k}) \end{bmatrix}\right. :$$
$$k = 0, 1, \ldots, N_H-1; n = 0, 1, \ldots, N_V-1 \Big\}; \text{ or}$$

$$\left\{\begin{bmatrix} \text{diag}(U_{V,n}) \otimes \text{diag}(U_{H,k}) & 0 \\ 0 & \text{diag}(B_n U_{V,n}) \otimes \text{diag}(U_{H,k}) \end{bmatrix}\right. :$$
$$k = 0, 1, \ldots, N_H-1; n = 0, 1, \ldots, N_V-1 \Big\}; \text{ or}$$

$$\left\{\begin{bmatrix} \text{diag}(U_{V,n}) \otimes \text{diag}(U_{H,k}) & 0 \\ 0 & \text{diag}(B_n U_{V,n}) \otimes \text{diag}(A_k U_{H,k}) \end{bmatrix}\right. :$$
$$k = 0, 1, \ldots, N_H-1; n = 0, 1, \ldots, N_V-1 \Big\}.$$

In the first approach, preferably the UE 10 can determine the first pre-coding indicator in Equation 5 or Equation 6 below after determining the first component pre-coding matrix:

$$i_1 = n \times N_H + k \quad \text{Equation 5;}$$

$$i_1 = k \times N_V + n \quad \text{Equation 6,}$$

$i_1$ represents the first pre-coding indicator.

In the first approach, preferably the UE 10 can determine the first pre-coding indicator corresponding to the first component pre-coding matrix according to a preset correspondence relationship between the first component pre-coding matrix and the first pre-coding indicator after determining the first component pre-coding matrix.

The correspondence relationship between the first component pre-coding matrix and the first pre-coding indicator can be preset as needed. In an implementation, the correspondence relationship can be specified in a protocol or can be signaled in higher-layer signaling.

In an implementation, the second component pre-coding matrix is the product of a $(2D_H D_V) \times r$-dimension matrix and a power normalization coefficient, r represents the number of columns in the pre-coding matrix, also referred to a rank; and The second component pre-coding matrix is:

$$W_2 = \begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, $i=1, \ldots, r$, $D_H$ and $D_V$ represent positive integers, and M represents the power normalization coefficient.

$\alpha_i$ is used for phase adjustment between two sets of antennas.

If $X_H^i$ represents an adjusting vector of horizontal beam-forming, then the effect thereof is to finely adjust a horizontal beam formed by $U_H$, and $X_V^i$ represents an adjusting vector of vertical beam-forming, the effect thereof is to finely adjust a vertical beam formed by $U_V$.

Particularly the second component pre-coding matrix $W_2$ is selected from a set, and the second pre-coding indicator corresponds to an element in the set. For example, for a codebook with r=1, there is a set of $W_2$, $$\left\{ \begin{bmatrix} X_{V,k}^1 \otimes X_{H,n}^1 \\ \alpha X_{V,k}^1 \otimes X_{H,n}^1 \end{bmatrix} : \right.$$

$k = 0, 1, \ldots, M_V - 1;$ $\left. n = 0, 1, \ldots, M_H - 1; \alpha = 1, -1, e^{j\frac{\pi}{2}}, e^{j\frac{\pi}{2}} \right\},$ $X_{V,k}^1$ is taken from a predefined set of vectors $\{X_{V,p}^1 : p=0, 1, \ldots, M_V-1\}$, particularly a Grassmanian vector or a DFT vector, e.g., $$[X_{V,k}^1]_i = e^{j2\pi \frac{ki}{L}} \text{ or } [X_{V,k}^1]_i = e^{-j2\pi \frac{ki}{L}},$$

or a combination of a Grassmanian vector and a DFT vector; and $X_{H,n}^1$ is taken from a predefined set of vectors $\{X_{H,q}^1 : q=0, 1, \ldots, M_H-1\}$, particularly a Grassmanian vector or a DFT vector, e.g., $$[X_{H,n}^1]_i = e^{j2\pi \frac{ni}{L}} \text{ or } [X_{H,n}^1]_i = e^{-j2\pi \frac{ni}{L}},$$

or a combination of a Grassmanian vector and a DFT vector.

Generally for a codebook with the rank r, the second component pre-coding matrix $W_2$ is taken from a set, all elements in the set being in the form of $$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix},$$

$X_V^t$ and $X_H^t$ can be a Grassmanian vector or a DFT vector, or a combination of a Grassmanian vector and a DFT vector, e.g., $$[X_{V,k}^t]_i = e^{j2\pi \frac{ki}{L}} \text{ or } [X_{V,k}^t]_i = e^{-j2\pi \frac{ki}{L}}, \text{ and}$$

$$[X_{H,k}^t]_i = e^{j2\pi \frac{ki}{L}} \text{ or } [X_{H,k}^t]_i = e^{-j2\pi \frac{ki}{L}},$$

$$\alpha_t \in \left\{ e^{j2\pi \frac{kz}{Z}} : z = 0, 1, \ldots, Z-1 \right\},$$

and $t=1, \ldots, r$, L represents the point number of DFT. Preferably L=2 or 4 or 8 or 16 or 32 or 64.

In the first approach, preferably the UE 10 can determine the second pre-coding indicator corresponding to the second component pre-coding matrix according to a preset correspondence relationship between the second component pre-coding matrix and the second pre-coding indicator after determining the second component pre-coding matrix.

The correspondence relationship between the second component pre-coding matrix and the second pre-coding indicator can be preset as needed. In an implementation, the correspondence relationship can be specified in a protocol or can be signaled in higher-layer signaling.

In an implementation, the pre-coding matrix is expressed of Equation 7 to Equation 10:

$$W = \qquad \text{Equation 7}$$

$$W_1 \cdot W_2 = \begin{bmatrix} \text{diag}(U_V) \otimes \text{diag}(U_H) & 0 \\ 0 & \text{diag}(U_V) \otimes \text{diag}(U_H) \end{bmatrix}$$

$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M;$$

$$W = W_1 \cdot W_2 = \qquad \text{Equation 8}$$

$$\begin{bmatrix} \text{diag}(U_V) \otimes \text{diag}(U_H) & 0 \\ 0 & \text{diag}(U_V) \otimes \text{diag}(AU_H) \end{bmatrix}$$

$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M$$

$$W = \qquad \text{Equation 9}$$

$$W_1 \cdot W_2 = \begin{bmatrix} \text{diag}(U_V) \otimes \text{diag}(U_H) & 0 \\ 0 & \text{diag}(BU_V) \otimes \text{diag}(U_H) \end{bmatrix}$$

$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M; \text{ and}$$

$$W = W_1 \cdot W_2 = \qquad \text{Equation 10}$$

$$\begin{bmatrix} \text{diag}(U_V) \otimes \text{diag}(U_H) & 0 \\ 0 & \text{diag}(BU_V) \otimes \text{diag}(AU_H) \end{bmatrix}$$

$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M.$$

W represents the pre-coding matrix; $W_1$ represents the first component pre-coding matrix; $W_2$ represents the second component pre-coding matrix; $U_H$ represents a horizontal beam-forming vector with $D_H \times 1$ dimension; $U_V$ represents a vertical beam-forming vector with $D_V \times 1$ dimension; A represents a diagonal matrix with $D_H \times D_H$ dimension; B represents a diagonal matrix with $D_V \times D_V$ dimension, $D_H$ and $D_V$ represent positive integers; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, i=1, ..., r, and r represents the number of columns in the pre-coding matrix, and M represents the power normalization coefficient.

Preferably $$M = \frac{1}{\sqrt{rD_H D_V}}.$$

In an implementation, Equation 7 to Equation 10 can be further transformed so that the second component pre-coding matrix in the equations above is the product of the matrix and M; or M can be a part of the first component pre-coding matrix, that is, the first component pre-coding matrix is the product of the matrix and M, and the second component pre-coding matrix is the matrix; or M can be separate, i.e., $W = W_1 \cdot W_2 \cdot M$.

Equation 7 to Equation 10 can be further transformed into the following equations:

$$W = W_1 \cdot W_2 = \begin{bmatrix} \mathrm{diag}(U_V \otimes U_H) & 0 \\ 0 & \mathrm{diag}(U_V \otimes U_H) \end{bmatrix} \quad \text{Equation 7'}$$
$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M;$$

$$W = W_1 \cdot W_2 = \begin{bmatrix} \mathrm{diag}(U_V \otimes U_H) & 0 \\ 0 & \mathrm{diag}(U_V \otimes (AU_H)) \end{bmatrix} \quad \text{Equation 8'}$$
$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M;$$

$$W = W_1 \cdot W_2 = \begin{bmatrix} \mathrm{diag}(U_V \otimes U_H) & 0 \\ 0 & \mathrm{diag}((BU_V) \otimes U_H) \end{bmatrix} \quad \text{Equation 9'}$$
$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M; \text{ and}$$

$$W = W_1 \cdot W_2 = \begin{bmatrix} \mathrm{diag}(U_V \otimes U_H) & 0 \\ 0 & \mathrm{diag}((BU_V) \otimes (AU_H)) \end{bmatrix} \quad \text{Equation 10'}$$
$$\begin{bmatrix} X_V^1 \otimes X_H^1 & \wedge & X_V^r \otimes X_H^r \\ \alpha_1 X_V^1 \otimes X_H^1 & \wedge & \alpha_r X_V^r \otimes X_H^r \end{bmatrix} M.$$

The UE 10 determines that the product of the first component pre-coding matrix and the second component pre-coding matrix is the pre-coding matrix, i.e., $W = W_1 \cdot W_2$.

In the first approach, if the UE 10 selects a plurality of first component pre-coding matrixes from the set of first component pre-coding matrixes and selects one second component pre-coding matrix from the set of second component pre-coding matrixes, then the UE 10 can select one of the plurality of first component pre-coding matrixes according to one pre-coding matrix of Equation 7 to Equation 10; or if the UE 10 selects a plurality of second component pre-coding matrixes from the set of second component pre-coding matrixes and selects one first component pre-coding matrix from the set of first component pre-coding matrixes, then the UE 10 can select one of the plurality of second component pre-coding matrixes according to one pre-coding matrix of Equation 7 to Equation 10.

Second approach, the UE 10 determines at least one pre-coding matrix; determines the first pre-coding indicator and the second pre-coding indicator corresponding to the at least one pre-coding matrix according to a correspondence relationship between the first pre-coding indicator, the second pre-coding indicator and the pre-coding matrix; and determines that one of the determined first pre-coding indicator and one of the determined second pre-coding indicator are the first pre-coding indicator and the second pre-coding indicator to be transmitted to the network side.

If the UE 10 determines a plurality of pre-coding matrixes, then the first pre-coding indicators corresponding to the plurality of pre-coding matrixes determined by the UE 10 are the same.

If the UE 10 determines a plurality of pre-coding matrixes, then the second pre-coding indicators corresponding to the plurality of pre-coding matrixes determined by the UE 10 are different.

The at least one pre-coding matrix determined by the UE 10 is equal to a matrix as a function of the first component pre-coding matrix and the second component pre-coding matrix. Particularly the at least one pre-coding matrix determined by the UE 10 is the product of the first component pre-coding matrix and the second component pre-coding matrix.

The equations in which the first component pre-coding matrix and the second component pre-coding matrix are expressed, and the relationship between the pre-coding matrix, and the first component pre-coding matrix and the second component pre-coding matrix, in the first approach above can also be applicable to the second approach.

The network-side device 20 can determine the pre-coding matrix according to the first pre-coding indicator and the second pre-coding indicator upon reception of the first pre-coding indicator and the second pre-coding indicator from the UE in a number of approaches, several of which will be listed below:

First approach, the network-side device 20 determines the first component pre-coding matrix corresponding to the first pre-coding indicator and determines the second component pre-coding matrix corresponding to the second pre-coding indicator; and The network-side device 20 determines the pre-coding matrix in one of Equation 7 to Equation 10.

The network-side device 20 determines the first component pre-coding matrix corresponding to the first pre-coding indicator in one of Equation 1 to Equation 4.

The network-side device 20 receives $i_1$ and determines n and k by equation $n = \lceil i_1 / N_H \rceil; k = i_1 \bmod N_H$ or $k = \lceil i_1 / N_V \rceil; n = i_1 \bmod N_V$ and then can determine A, B, $U_V$ and $U_H$ according to n and k, and then substitute A, B, $U_V$ and $U_H$ into one of Equation 1 to Equation 4 to thereby determine the first component pre-coding matrix corresponding to the first pre-coding indicator.

Particularly network-side device 20 can determine the first component pre-coding matrix corresponding to the first pre-coding indicator in the following equation after combining $n = \lceil i_1 / N_H \rceil; k = i_1 \bmod N_H$ or $k = \lceil i_1 / N_V \rceil; n = i_1 \bmod N_V$ with Equation 1 to Equation 4:

$$W_1 = f(i_1) = \begin{bmatrix} \mathrm{diag}(U_V) \otimes \mathrm{diag}(U_H) & 0 \\ 0 & \mathrm{diag}(U_V) \otimes \mathrm{diag}(U_H) \end{bmatrix},$$

$$n = \lceil i_1 / N_H \rceil; k = i_1 \bmod N_H;$$

or $$W_1 = f(i_1) = \begin{bmatrix} \mathrm{diag}(U_V) \otimes \mathrm{diag}(U_H) & 0 \\ 0 & \mathrm{diag}(U_V) \otimes \mathrm{diag}(AU_H) \end{bmatrix},$$

$$n = \lceil i_1 / N_H \rceil; k = i_1 \bmod N_H;$$

-continued or $$W_1 = f(i_1) = \begin{bmatrix} \mathrm{diag}(U_V) \otimes \mathrm{diag}(U_H) & 0 \\ 0 & \mathrm{diag}(BU_V) \otimes \mathrm{diag}(U_H) \end{bmatrix},$$

$n = \lceil i_1 / N_H \rceil; k = i_1 \bmod N_H;$ or $$W_1 = f(i_1) = \begin{bmatrix} \mathrm{diag}(U_V) \otimes \mathrm{diag}(U_H) & 0 \\ 0 & \mathrm{diag}(BU_V) \otimes \mathrm{diag}(AU_H) \end{bmatrix},$$

$n = \lceil i_1 / N_H \rceil; k = i_1 \bmod N_H;$ or $$W_1 = f(i_1) = \begin{bmatrix} \mathrm{diag}(U_V) \otimes \mathrm{diag}(U_H) & 0 \\ 0 & \mathrm{diag}(U_V) \otimes \mathrm{diag}(U_H) \end{bmatrix},$$

$k = \lceil i_1 / N_V \rceil; n = i_1 \bmod N_V;$ or $$W_1 = f(i_1) = \begin{bmatrix} \mathrm{diag}(U_V) \otimes \mathrm{diag}(U_H) & 0 \\ 0 & \mathrm{diag}(U_V) \otimes \mathrm{diag}(AU_H) \end{bmatrix},$$

$k = \lceil i_1 / N_V \rceil; n = i_1 \bmod N_V;$ or $$W_1 = f(i_1) = \begin{bmatrix} \mathrm{diag}(U_V) \otimes \mathrm{diag}(U_H) & 0 \\ 0 & \mathrm{diag}(BU_V) \otimes \mathrm{diag}(U_H) \end{bmatrix},$$

$k = \lceil i_1 / N_V \rceil; n = i_1 \bmod N_V;$ or $$W_1 = f(i_1) = \begin{bmatrix} \mathrm{diag}(U_V) \otimes \mathrm{diag}(U_H) & 0 \\ 0 & \mathrm{diag}(BU_V) \otimes \mathrm{diag}(AU_H) \end{bmatrix},$$

$k = \lceil i_1 / N_V \rceil; n = i_1 \bmod N_V.$

The equations above can be further transformed in the following equations:

$$W_1 = f(i_1) = \begin{bmatrix} \mathrm{diag}(U_{V,n} \otimes U_{H,k}) & 0 \\ 0 & \mathrm{diag}(U_{V,n} \otimes U_{H,k}) \end{bmatrix},$$

$n = \lceil i_1 / N_H \rceil; k = i_1 \bmod N_H;$ or $$W_1 = f(i_1) = \begin{bmatrix} \mathrm{diag}(U_{V,n} \otimes U_{H,k}) & 0 \\ 0 & \mathrm{diag}(U_{V,n} \otimes (A_k U_{H,k})) \end{bmatrix},$$

$n = \lceil i_1 / N_H \rceil; k = i_1 \bmod N_H;$ or $$W_1 = f(i_1) = \begin{bmatrix} \mathrm{diag}(U_{V,n} \otimes U_{H,k}) & 0 \\ 0 & \mathrm{diag}((B_n U_{V,n}) \otimes U_{H,k}) \end{bmatrix},$$

$n = \lceil i_1 / N_H \rceil; k = i_1 \bmod N_H;$ or $$W_1 = f(i_1) = \begin{bmatrix} \mathrm{diag}(U_{V,n} \otimes U_{H,k}) & 0 \\ 0 & \mathrm{diag}((B_n U_{V,n}) \otimes (A_k U_{H,k})) \end{bmatrix},$$

$n = \lceil i_1 / N_H \rceil; k = i_1 \bmod N_H;$ or $$W_1 = f(i_1) = \begin{bmatrix} \mathrm{diag}(U_{V,n} \otimes U_{H,k}) & 0 \\ 0 & \mathrm{diag}(U_{V,n} \otimes U_{H,k}) \end{bmatrix},$$

$k = \lceil i_1 / N_V \rceil; n = i_1 \bmod N_V;$ or $$W_1 = f(i_1) = \begin{bmatrix} \mathrm{diag}(U_{V,n} \otimes U_{H,k}) & 0 \\ 0 & \mathrm{diag}(U_{V,n} \otimes (A_k U_{H,k})) \end{bmatrix},$$

$k = \lceil i_1 / N_V \rceil; n = i_1 \bmod N_V;$ or $$W_1 = f(i_1) = \begin{bmatrix} \mathrm{diag}(U_{V,n} \otimes U_{H,k}) & 0 \\ 0 & \mathrm{diag}((B_n U_{V,n}) \otimes (A_k U_{H,k})) \end{bmatrix},$$

$k = \lceil i_1 / N_V \rceil; n = i_1 \bmod N_V;$ or $$W_1 = f(i_1) = \begin{bmatrix} \mathrm{diag}(U_{V,n} \otimes U_{H,k}) & 0 \\ 0 & \mathrm{diag}((B_n U_{V,n}) \otimes U_{H,k}) \end{bmatrix},$$

$k = \lceil i_1 / N_V \rceil; n = i_1 \bmod N_V.$

Alternatively the network-side device 20 determines the first component pre-coding matrix corresponding to the received first pre-coding indicator according to a preset correspondence relationship between the first component pre-coding matrix and the first pre-coding indicator.

The network-side device 20 determines the second component pre-coding matrix corresponding to the received second pre-coding indicator according to a preset correspondence relationship between the second component pre-coding matrix and the second pre-coding indicator.

If both the UE 10 and the network-side device 20 determine the first component pre-coding matrix in one of Equation 1 to Equation 4, then the particular one equation can be specified in a protocol or can be signaled in higher signaling or can be determined as a result of negotiation between the UE 10 and the network-side device 20 as long as the same equation is applied at the UE 10 and the network-side device 20.

Second approach, the network-side device 20 determines the pre-coding matrix corresponding to the received first pre-coding indicator and second pre-coding indicator according to a preset correspondence relationship between the first pre-coding indicator, the second pre-coding indicator and the pre-coding matrix.

The correspondence relationship between the first pre-coding indicator, the second pre-coding indicator and the pre-coding matrix can be preset as needed. In an implementation, the correspondence relationship can be specified in a protocol or can be signaled in higher signaling.

The network-side device 20 preprocesses data transmitted by the UE 10 using the determined pre-coding matrix after determining the pre-coding matrix.

The horizontal and vertical dimensions can be interchangeable in the embodiment of the invention.

The network-side device 20 in the embodiment of the invention can be an eNB (e.g., a macro eNB, a home eNB, etc.) or a Relay Node (RN) device or another network-side device.

Figure 5:
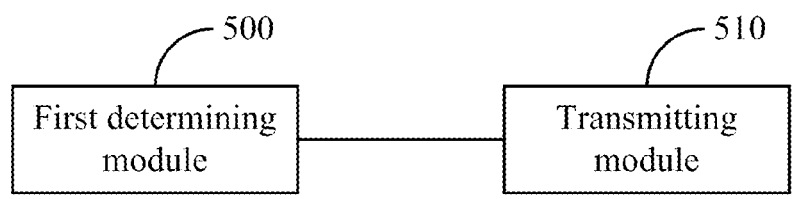
FIG. 5 illustrates a schematic structural diagram of a UE in a system for determining a pre-coding matrix according to an embodiment of the invention.

As illustrated in FIG. 5, a UE in a system for determining a pre-coding matrix according to an embodiment of the invention includes a first determining module 500 and a transmitting module 510, wherein:

The first determining module 500 is configured to determine a first pre-coding indicator and a second pre-coding indicator, the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and The transmitting module 510 is configured to transmit the first pre-coding indicator and the second pre-coding indicator to the network side.

The first component pre-coding matrix is:

$$W_1 = \begin{bmatrix} \text{diag}(U_V) \otimes \text{diag}(U_H) & 0 \\ 0 & \text{diag}(U_V) \otimes \text{diag}(U_H) \end{bmatrix};$$

or $$W_1 = \begin{bmatrix} \text{diag}(U_V) \otimes \text{diag}(U_H) & 0 \\ 0 & \text{diag}(U_V) \otimes \text{diag}(AU_H) \end{bmatrix};$$

or $$W_1 = \begin{bmatrix} \text{diag}(U_V) \otimes \text{diag}(U_H) & 0 \\ 0 & \text{diag}(BU_V) \otimes \text{diag}(U_H) \end{bmatrix};$$

or $$W_1 = \begin{bmatrix} \text{diag}(U_V) \otimes \text{diag}(U_H) & 0 \\ 0 & \text{diag}(BU_V) \otimes \text{diag}(AU_H) \end{bmatrix},$$

$W_1$ represents the first component pre-coding matrix; $U_H$ represents a beam-forming vector with $D_H \times 1$ dimension; $U_V$ Represents a Beam-Forming Vector with $D_V \times 1$ dimension; A represents a diagonal matrix with $D_H \times D_H$ dimension; B represents a diagonal matrix with $D_V \times D_V$ dimension, $D_H$ and $D_V$ represent positive integers; and diag(U) represents a diagonal matrix, constructed by vector U, with elements on the diagonal being equal to elements in the vector U.

Preferably $U_H$ represents an element in a set of beam-forming vectors $\{U_{H,p}: p=0, 1, \ldots, N_H-1\}$ with $U_H=U_{H,k}$ and $0 \le k \le N_H-1$; and $U_V$ represents an element in a set of beam-forming vectors $\{U_{V,q}: q=0, 1, \ldots, N_V-1\}$ with $U_V=U_{V,n}$ and $0 \le n \le N_V-1$, where $N_H$ and $N_V$ represent positive integers.

Preferably the second component pre-coding matrix is the product of a $(2D_H D_V) \times r$-dimension matrix and a power normalization coefficient, r represents the number of columns in the pre-coding matrix; and The second component pre-coding matrix is:

$$W_2 = \begin{bmatrix} X_V^1 \otimes X_H^1 & \Lambda & X_V^r \otimes X_H^r \\ \alpha_1 X_V^1 \otimes X_H^1 & \Lambda & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, $i=1, \ldots, r$, $D_H$ and $D_V$ represent positive integers, and M represents the power normalization coefficient.

Preferably the first determining module 500 selects the first component pre-coding matrix from a set of first component pre-coding matrixes and determines the first pre-coding indicator corresponding to the selected first component pre-coding matrix, and selects the second component pre-coding matrix from a set of second component pre-coding matrixes and determines the second pre-coding indicator corresponding to the selected second component pre-coding matrix.

Preferably the first determining module 500 determines the first pre-coding indicator in the equation of:

$$i_1 = n \times N_H + k \text{ or } i_1 = k \times N_V + n,$$

$i_1$ represents the first pre-coding indicator.

Preferably the first determining module 500 determines the second pre-coding indicator corresponding to the second component pre-coding matrix according to a preset correspondence relationship between the second component pre-coding matrix and the second pre-coding indicator.

Preferably the first determining module 500 determines that the product of the first component pre-coding matrix and the second component pre-coding matrix is the pre-coding matrix.

Preferably the first determining module 500 determines at least one pre-coding matrix; determines one or more first pre-coding indicators and one or more second pre-coding indicators corresponding to the at least one pre-coding matrix according to a correspondence relationship between the first pre-coding indicator, the second pre-coding indicator and the pre-coding matrix; and determines one of the determined one or more first pre-coding indicators and one of the determined one or more second pre-coding indicators to the pre-coding indicator and the second pre-coding indicator to be transmitted to the network side.

If the first determining module 500 determines a plurality of pre-coding matrixes, then the first pre-coding indicators corresponding to the determined plurality of pre-coding matrixes are the same.

If the first determining module 500 determines a plurality of pre-coding matrixes, then the second pre-coding indicators corresponding to the determined plurality of pre-coding matrixes are different.

Figure 6:
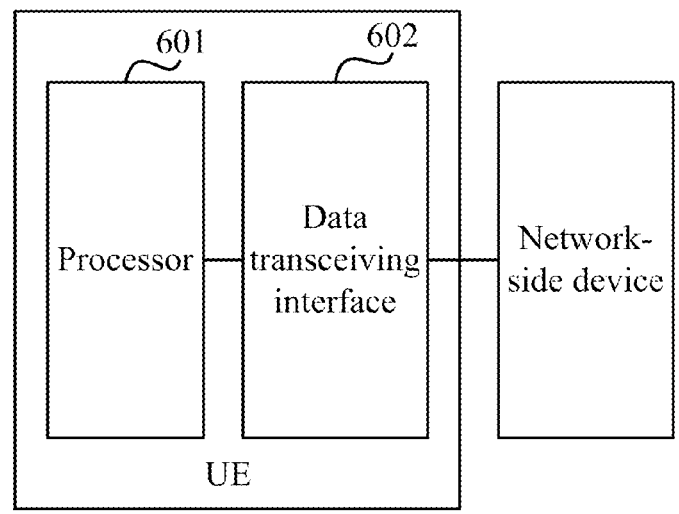
FIG. 6 illustrates a schematic structural diagram of a UE in hardware in a system for determining a pre-coding matrix according to an embodiment of the invention.

An embodiment of the invention provides a UE, and FIG. 6 illustrates a schematic structural diagram thereof in hardware, including a processor 601 and a data transceiving interface 602, wherein:

The processor 601 is configured to determine a first pre-coding indicator and a second pre-coding indicator, the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and to transmit the first pre-coding indicator and the second pre-coding indicator to the network side; and The data transceiving interface 602 is configured to communicate data with the network-side device.

Figure 7:
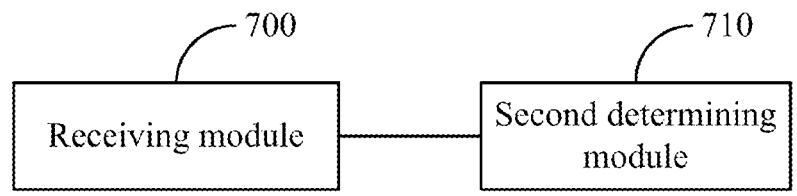
FIG. 7 illustrates a schematic structural diagram of a network-side device in a system for determining a pre-coding matrix according to an embodiment of the invention.

As illustrated in FIG. 7, a network-side device in a system for determining a pre-coding matrix according to an embodiment of the invention includes a receiving module 700 and a second determining module 710, wherein:

The receiving module 700 is configured to receive a first pre-coding indicator and a second pre-coding indicator from a UE; and The second determining module 710 is configured to determine a pre-coding matrix corresponding to the first pre-coding indicator and the second pre-coding indicator.

The pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

Preferably the second determining module 710 determines the first component pre-coding matrix corresponding to the first pre-coding indicator, determines the second component pre-coding matrix corresponding to the second pre-coding indicator and determines that the product of the first component pre-coding matrix and the second component pre-coding matrix is the pre-coding matrix.

Preferably the second determining module 710 determines the first component pre-coding matrix corresponding to the first pre-coding indicator in the equation of:

$$W_1 = \begin{bmatrix} \mathrm{diag}(U_V) \otimes \mathrm{diag}(U_H) & 0 \\ 0 & \mathrm{diag}(U_V) \otimes \mathrm{diag}(U_H) \end{bmatrix};$$

or $$W_1 = \begin{bmatrix} \mathrm{diag}(U_V) \otimes \mathrm{diag}(U_H) & 0 \\ 0 & \mathrm{diag}(U_V) \otimes \mathrm{diag}(AU_H) \end{bmatrix};$$

or $$W_1 = \begin{bmatrix} \mathrm{diag}(U_V) \otimes \mathrm{diag}(U_H) & 0 \\ 0 & \mathrm{diag}(BU_V) \otimes \mathrm{diag}(U_H) \end{bmatrix};$$

or $$W_1 = \begin{bmatrix} \mathrm{diag}(U_V) \otimes \mathrm{diag}(U_H) & 0 \\ 0 & \mathrm{diag}(BU_V) \otimes \mathrm{diag}(AU_H) \end{bmatrix};$$

$W_1$ represents the first component pre-coding matrix; $U_H$ represents a beam-forming vector with $D_H \times 1$ dimension; $U_V$ represents a beam-forming vector with $D_V \times 1$ dimension; A represents a diagonal matrix with $D_H \times D_H$ dimension; B represents a diagonal matrix with $D_V \times D_V$ dimension, $D_H$ and $D_V$ represent positive integers; and diag(U) represents a diagonal matrix, derived from a vector U, with elements on the diagonal being equal to elements in the vector U.

Preferably $U_H$ represents an element in a set of beam-forming vectors $\{U_{H,p}: p=0, 1, \ldots, N_H-1\}$ with $U_H=U_{H,k}$ and $0 \le k \le N_H-1$; and $U_V$ represents an element in a set of beam-forming vectors $\{U_{V,q}: q=0, 1, \ldots, N_V-1\}$ with $U_V=U_{V,n}$ and $0 \le n \le N_V-1$, where $N_H$ and $N_V$ represent positive integers.

Preferably the second component pre-coding matrix is the product of $(2D_H D_V) \times r$-dimension matrix and a power normalization coefficient, r represents the number of columns in the pre-coding matrix; and The second component pre-coding matrix is:

$$W_2 = \begin{bmatrix} X_V^1 \otimes X_H^1 & \Lambda & X_V^r \otimes X_H^r \\ \alpha_1 X_V^1 \otimes X_H^1 & \Lambda & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, i=1, ..., r, $D_H$ and $D_V$ represent positive integers, and M represents the power normalization coefficient.

Preferably the second determining module 710 determines the first component pre-coding matrix corresponding to the received first pre-coding indicator according to a preset correspondence relationship between the first component pre-coding matrix and the first pre-coding indicator.

Preferably the second determining module 710 determines the second component pre-coding matrix corresponding to the received second pre-coding indicator according to a preset correspondence relationship between the second component pre-coding matrix and the second pre-coding indicator.

Preferably the second determining module 710 determines the pre-coding matrix corresponding to the received first pre-coding indicator and second pre-coding indicator according to a preset correspondence relationship between the first pre-coding indicator, the second pre-coding indicator and the pre-coding matrix.

Figure 8:
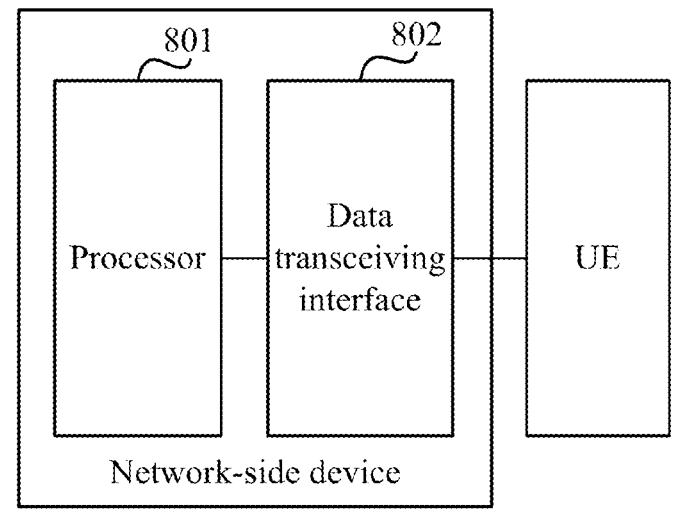
FIG. 8 illustrates a schematic structural diagram of a network-side device in hardware in a system for determining a pre-coding matrix according to an embodiment of the invention.

An embodiment of the invention provides a network-side device, and FIG. 8 illustrates a schematic structural diagram thereof in hardware, including a processor 801 and a data transceiving interface 802, wherein:

The processor 801 is configured to receive a first pre-coding indicator and a second pre-coding indicator from a UE; and to determine a pre-coding matrix corresponding to the first pre-coding indicator and the second pre-coding indicator, wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

The data transceiving interface 802 is configured to communicate data with the UE.

Based upon the same inventive idea, an embodiment of the invention further provides a method for transmitting a pre-coding indicator, and since the UE in the system for determining a pre-coding matrix is a device corresponding to this method, and this method addresses the problem under a similar principle to the UE in the system for determining a pre-coding matrix, reference can be made to the implementation of the UE for an implementation of this method, and a repeated description thereof will be omitted here.

Figure 9:
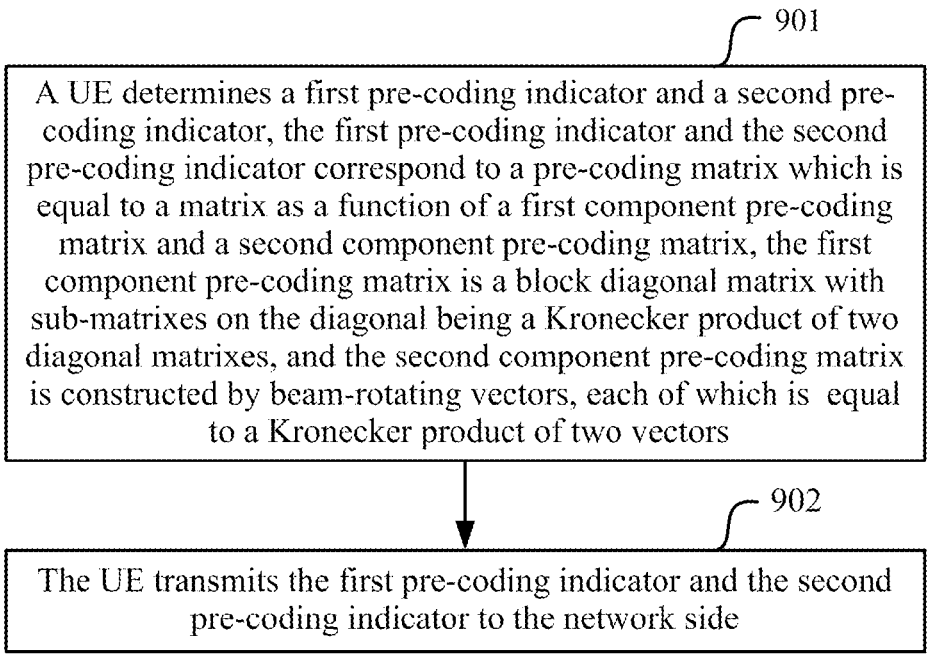
FIG. 9 illustrates a schematic flow chart of a method for transmitting a pre-coding indicator according to an embodiment of the invention.

As illustrated in FIG. 9, a method for transmitting a pre-coding indicator according to an embodiment of the invention includes the following operations:

Operation 901, a UE determines a first pre-coding indicator and a second pre-coding indicator, the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors; and Operation 902, the UE transmits the first pre-coding indicator and the second pre-coding indicator to the network side.

In an implementation, the UE can determine the first pre-coding indicator and the second pre-coding indicator in a number of approaches, several of which will be listed below:

First approach, the UE selects the first component pre-coding matrix from a set of first component pre-coding matrixes and determines the first pre-coding indicator corresponding to the selected first component pre-coding matrix, and selects the second component pre-coding matrix from a set of second component pre-coding matrixes and determines the second pre-coding indicator corresponding to the selected second component pre-coding matrix.

Particularly the UE estimates a channel of each antenna port to the UE according to a pilot symbol transmitted by the network-side device, and each antenna port corresponds to one or more physical antennas; and Then the UE selects the first component pre-coding matrix from the set of first component pre-coding matrixes, and selects the second component pre-coding matrix from the set of second component pre-coding matrixes, according to the estimated channel.

In the first approach, the UE can transmit the first pre-coding indicator and the second pre-coding indicator to the network-side device over an uplink channel by reporting the first pre-coding indicator and the second pre-coding indicator at different time at different time granularities and frequency granularities or at the same time.

In the first approach, the UE can transmit the first pre-coding indicator and the second pre-coding indicator to the network-side device over an uplink channel by reporting the first pre-coding indicator and the second pre-coding indicator at different time at different time granularities and frequency granularities or at the same time.

In an implementation, if the first component pre-coding matrix in the embodiment of the invention is a block diagonal matrix, then the first component pre-coding matrix is expressed in one of Equation 1 to Equation 4 above.

In the first approach, the set of first component pre-coding matrixes is composed of first component pre-coding matrixes expressed in one of Equation 1 to Equation 4 above; and in the second approach, each first component pre-coding matrix is determined in one of Equation 1 to Equation 4 above.

In the first approach, preferably the UE can determine the first pre-coding indicator in Equation 5 or Equation 6 above after determining the first component pre-coding matrix.

In an implementation, the second component pre-coding matrix is the product of a $(2D_H D_V) \times r$-dimension matrix and a power normalization coefficient, r represents the number of columns in the pre-coding matrix, also referred to a rank; and The second component pre-coding matrix is:

$$W_2 = \begin{bmatrix} X_V^1 \otimes X_H^1 & \Lambda & X_V^r \otimes X_H^r \\ \alpha_1 X_V^1 \otimes X_H^1 & \Lambda & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, $i=1, \ldots, r$, and $D_H$ and $D_V$ represent positive integers, and M represents the power normalization coefficient.

In the first approach, preferably the UE can determine the second pre-coding indicator corresponding to the second component pre-coding matrix according to a preset correspondence relationship between the second component pre-coding matrix and the second pre-coding indicator after determining the second component pre-coding matrix.

The correspondence relationship between the second component pre-coding matrix and the second pre-coding indicator can be preset as needed. In an implementation, the correspondence relationship can be specified in a protocol or can be signaled in higher-layer signaling.

In the first approach, if the UE selects a plurality of first component pre-coding matrixes from the set of first component pre-coding matrixes and selects one second component pre-coding matrix from the set of second component pre-coding matrixes, then the UE can select one of the plurality of first component pre-coding matrixes according to one of Equation 7 to Equation 10, or if the UE selects a plurality of second component pre-coding matrixes from the set of second component pre-coding matrixes and selects one first component pre-coding matrix from the set of first component pre-coding matrixes, then the UE can select one of the plurality of second component pre-coding matrixes according to one of Equation 7 to Equation 10.

Second approach, the UE determines at least one pre-coding matrix; determines first pre-coding indicator and second pre-coding indicator corresponding to the at least one pre-coding matrix according to a correspondence relationship between the first pre-coding indicator, the second pre-coding indicator and the pre-coding matrix; and determines that one of the determined first pre-coding indicator and one of the determined second pre-coding indicator are the first pre-coding indicator and the second pre-coding indicator to be transmitted to the network side.

If the UE determines a plurality of pre-coding matrixes, then the first pre-coding indicators corresponding to the plurality of pre-coding matrixes determined by the UE are the same.

If the UE determines a plurality of pre-coding matrixes, then the second pre-coding indicators corresponding to the plurality of pre-coding matrixes determined by the UE are different.

The equations in which the first component pre-coding matrix and the second component pre-coding matrix are expressed in the first approach above can also be applicable to the second approach.

Based upon the same inventive idea, an embodiment of the invention further provides a method for determining a pre-coding matrix, and since the network-side device in the system for determining a pre-coding matrix is a device corresponding to this method, and this method addresses the problem under a similar principle to the network-side device in the system for determining a pre-coding matrix, reference can be made to the implementation of the network-side device for an implementation of this method, and a repeated description thereof will be omitted here.

Figure 10:
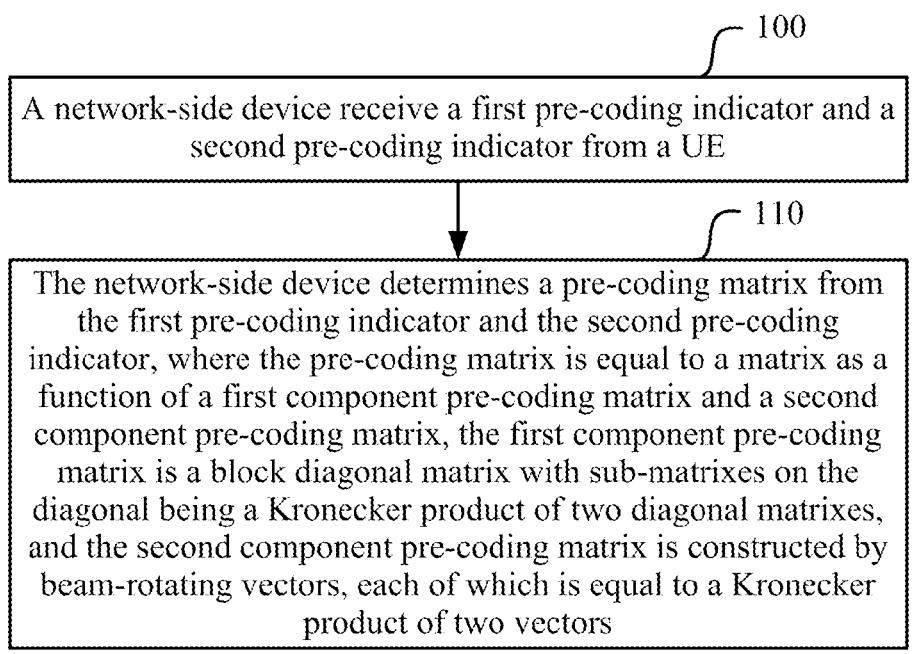
FIG. 10 illustrates a schematic flow chart of a method for determining a pre-coding matrix according to an embodiment of the invention.

As illustrated in FIG. 10, a method for determining a pre-coding matrix according to an embodiment of the invention includes the following operations:

Operation 100, a network-side device receives a first pre-coding indicator and a second pre-coding indicator from a UE; and Operations 110, the network-side device determines a pre-coding matrix corresponding to the first pre-coding indicator and the second pre-coding indicator.

The pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

The network-side device can determine the pre-coding matrix according to the first pre-coding indicator and the second pre-coding indicator upon reception of the first pre-coding indicator and the second pre-coding indicator from the UE in a number of approaches, several of which will be listed below:

First approach, the network-side device determines the first component pre-coding matrix corresponding to the first pre-coding indicator and determines the second component pre-coding matrix corresponding to the second pre-coding indicator; and The network-side device determines the pre-coding matrix in one of Equation 7 to Equation 10.

The network-side device determines the first component pre-coding matrix corresponding to the first pre-coding indicator in one of Equation 1 to Equation 4.

Alternatively the network-side device can determine the first component pre-coding matrix corresponding to the received first pre-coding indicator according to a preset correspondence relationship between the first component pre-coding matrix and the first pre-coding indicator.

The network-side device can determine the second component pre-coding matrix corresponding to the received second pre-coding indicator according to a preset correspondence relationship between the second component pre-coding matrix and the second pre-coding indicator.

If both the UE and the network-side device determine the first component pre-coding matrix in one of Equation 1 to Equation 4, then the particular one equation can be specified in a protocol or can be signaled in higher signaling or can be determined as a result of negotiation between the UE and the network-side device as long as the same equation is applied at the UE and the network-side device.

Second approach, the network-side device determines the pre-coding matrix corresponding to the received first pre-coding indicator and second pre-coding indicator according to a preset correspondence relationship between the first pre-coding indicator, the second pre-coding indicator and the pre-coding matrix.

The correspondence relationship between the first pre-coding indicator, the second pre-coding indicator and the pre-coding matrix can be preset as needed. In an implementation, the correspondence relationship can be specified in a protocol or can be signaled in higher signaling.

The network-side device preprocesses data transmitted by the UE using the determined pre-coding matrix after determining the pre-coding matrix.

The horizontal and vertical dimensions can be interchangeable in the embodiment of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a pre-coding indicator, the method comprising:

determining, by a UE, a first pre-coding indicator and a second pre-coding indicator, the first pre-coding indicator and the second pre-coding indicator corresponding to a pre-coding matrix which is equal to a matrix as a function of a first component pre-coding matrix and a second component pre-coding matrix, the first component pre-coding matrix being a block diagonal matrix with sub-matrixes on the diagonal being a Kronecker product of two diagonal matrixes, and the second component pre-coding matrix being constructed by beam-rotating vectors, each of the beam-rotating vectors being equal to a Kronecker product of two vectors; and transmitting, by the UE, the first pre-coding indicator and the second pre-coding indicator to a network side.

2. The method according to claim 1, wherein the first component pre-coding matrix is:

$$W_1 = \begin{bmatrix} \text{diag}(U_V) \otimes \text{diag}(U_H) & 0 \\ 0 & \text{diag}(U_V) \otimes \text{diag}(U_H) \end{bmatrix};$$

or $$W_1 = \begin{bmatrix} \text{diag}(U_V) \otimes \text{diag}(U_H) & 0 \\ 0 & \text{diag}(U_V) \otimes \text{diag}(AU_H) \end{bmatrix};$$

or $$W_1 = \begin{bmatrix} \text{diag}(U_V) \otimes \text{diag}(U_H) & 0 \\ 0 & \text{diag}(BU_V) \otimes \text{diag}(U_H) \end{bmatrix};$$

or $$W_1 = \begin{bmatrix} \text{diag}(U_V) \otimes \text{diag}(U_H) & 0 \\ 0 & \text{diag}(BU_V) \otimes \text{diag}(AU_H) \end{bmatrix},$$

$W_1$ represents the first component pre-coding matrix; $U_H$ represents a beam-forming vector with $D_H \times 1$ dimension; $U_V$ represents a beam-forming vector with $D_V \times 1$ dimension; A represents a diagonal matrix with $D_H \times D_H$ dimension; B represents a diagonal matrix with $D_V \times D_V$ dimension, $D_H$ and $D_V$ represent positive integers; and diag(U) represents a diagonal matrix, derived from a vector U, with elements on the diagonal being equal to elements in the vector U.

3. The method according to claim 2, wherein $U_H$ represents an element in a set of beam-forming vectors $\{U_{H,p}: p=0,1,\ldots,N_H-1\}$ with $U_H=U_{H,k}$ and $0 \leq k \leq N_H-1$, $N_H$ represents a positive integer; and $U_V$ represents an element in a set of beam-forming vectors $\{U_{V,q}: q=0,1,\ldots,N_V-1\}$ with $U_V=U_{V,n}$ and $0 \leq n \leq N_V-1$, $N_V$ represents a positive integer.

4. The method according to claim 3, wherein the UE determines the first pre-coding indicator in the equation of:

$$i_1 = n \times N_H + k \text{ or } i_1 = k \times N_V + n,$$

$i_1$ represents the first pre-coding indicator.

5. The method according to claim 1, wherein the second component pre-coding matrix is a product of a $(2D_H D_V) \times r$ -dimension matrix and a power normalization coefficient, r represents the number of columns in the pre-coding matrix; and the second component pre-coding matrix is:

$$W_2 = \begin{bmatrix} X_V^1 \otimes X_H^1 & \cdots & X_V^r \otimes X_H^r \\ \alpha_1 X_V^1 \otimes X_H^1 & \cdots & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, $i=1, \ldots, r$, $D_H$ and $D_V$ represent positive integers, and M represents the power normalization coefficient.

6. The method according to claim 1, wherein the determining, by the UE, the first pre-coding indicator and the second pre-coding indicator comprises:

selecting, by the UE, the first component pre-coding matrix from a set of first component pre-coding matrixes and determining the first pre-coding indicator corresponding to the selected first component pre-coding matrix, and selecting the second component pre-coding matrix from a set of second component pre-coding matrixes and determining the second pre-coding indicator corresponding to the selected second component pre-coding matrix;

or, wherein the determining, by the UE, the first pre-coding indicator and the second pre-coding indicator comprises:

determining, by the UE, at least one pre-coding matrix and determining first pre-coding indicator and second pre-coding indicator corresponding to the at least one pre-coding matrix according to a correspondence relationship between the first pre-coding indicator, the second pre-coding indicator and the pre-coding matrix; and determining, by the UE, that one of the determined first pre-coding indicator and one of the determined second pre-coding indicator are the first pre-coding indicator and the second pre-coding indicator to be transmitted to the network side.

7. The method according to claim 1, wherein the UE determines that a product of the first component pre-coding matrix and the second component pre-coding matrix is the pre-coding matrix.

8. A method for determining a pre-coding matrix, the method comprising:

receiving, by a network-side device, a first pre-coding indicator and a second pre-coding indicator from a UE; and determining, by the network-side device, a pre-coding matrix corresponding to the first pre-coding indicator and the second pre-coding indicator, the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

9. The method according to claim 8, wherein the determining, by the network-side device, the pre-coding matrix comprises:

determining, by the network-side device, the first component pre-coding matrix corresponding to the first pre-coding indicator and determining the second component pre-coding matrix corresponding to the second pre-coding indicator; and determining, by the network-side device, that a product of the first component pre-coding matrix and the second component pre-coding matrix is the pre-coding matrix;

or, determining, by the network-side device, the pre-coding matrix comprises:

determining, by the network-side device, the pre-coding matrix corresponding to the received first pre-coding indicator and second pre-coding indicator according to a preset correspondence relationship between the first pre-coding indicator, the second pre-coding indicator and the pre-coding matrix.

10. The method according to claim 9, wherein the network-side device determines the first component pre-coding matrix corresponding to the first pre-coding indicator in the equation of:

$$W_1 = \begin{bmatrix} \operatorname{diag}(U_V) \otimes \operatorname{diag}(U_H) & 0 \\ 0 & \operatorname{diag}(U_V) \otimes \operatorname{diag}(U_H) \end{bmatrix};$$

or $$W_1 = \begin{bmatrix} \operatorname{diag}(U_V) \otimes \operatorname{diag}(U_H) & 0 \\ 0 & \operatorname{diag}(U_V) \otimes \operatorname{diag}(AU_H) \end{bmatrix};$$

or $$W_1 = \begin{bmatrix} \operatorname{diag}(U_V) \otimes \operatorname{diag}(U_H) & 0 \\ 0 & \operatorname{diag}(BU_V) \otimes \operatorname{diag}(U_H) \end{bmatrix};$$

or $$W_1 = \begin{bmatrix} \operatorname{diag}(U_V) \otimes \operatorname{diag}(U_H) & 0 \\ 0 & \operatorname{diag}(BU_V) \otimes \operatorname{diag}(AU_H) \end{bmatrix};$$

$W_1$ represents the first component pre-coding matrix; $U_H$ represents a beam-forming vector with $D_H \times 1$ dimension; $U_V$ represents a beam-forming vector with $D_V \times 1$ dimension; A represents a diagonal matrix with $D_H \times D_H$ dimension; B represents a diagonal matrix with $D_V \times D_V$ dimension, $D_H$ and $D_V$ represent positive integers; and diag(U) represents a diagonal matrix, derived from a vector U, with elements on the diagonal being equal to elements in the vectors U.

11. The method according to claim 9, wherein the second component pre-coding matrix is a product of a $(2D_H D_V) \times r$ -dimension matrix and a power normalization coefficient, r represents the number of columns in the pre-coding matrix; and the second component pre-coding matrix is:

$$W_2 = \begin{bmatrix} X_V^1 \otimes X_H^1 & \cdots & X_V^r \otimes X_H^r \\ \alpha_1 X_V^1 \otimes X_H^1 & \cdots & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, i=1, . . . , r, $D_H$ and $D_V$ represent positive integers, and M represents the power normalization coefficient.

12. A UE for transmitting a pre-coding indicator, the UE comprising:
a first determining device configured to determine a first pre-coding indicator and a second pre-coding indicator, the first pre-coding indicator and the second pre-coding indicator corresponding to a pre-coding matrix which is equal to a matrix as a function of a first component pre-coding matrix and a second component pre-coding matrix, the first component pre-coding matrix being a block diagonal matrix with sub-matrixes on the diagonal being a Kronecker product of two diagonal matrixes, and the second component pre-coding matrix being constructed by beam-rotating vectors, each of the beam-rotating vectors being equal to a Kronecker product of two vectors; and
a transmitting device configured to transmit the first pre-coding indicator and the second pre-coding indicator to a network side.

13. The UE according to claim 12, wherein the first component pre-coding matrix is:

$$W_1 = \begin{bmatrix} \text{diag}(U_V) \otimes \text{diag}(U_H) & 0 \\ 0 & \text{diag}(U_V) \otimes \text{diag}(U_H) \end{bmatrix};$$

or $$W_1 = \begin{bmatrix} \text{diag}(U_V) \otimes \text{diag}(U_H) & 0 \\ 0 & \text{diag}(U_V) \otimes \text{diag}(AU_H) \end{bmatrix};$$

or $$W_1 = \begin{bmatrix} \text{diag}(U_V) \otimes \text{diag}(U_H) & 0 \\ 0 & \text{diag}(BU_V) \otimes \text{diag}(U_H) \end{bmatrix};$$

or $$W_1 = \begin{bmatrix} \text{diag}(U_V) \otimes \text{diag}(U_H) & 0 \\ 0 & \text{diag}(BU_V) \otimes \text{diag}(AU_H) \end{bmatrix};$$

$W_1$ represents the first component pre-coding matrix; $U_H$ represents a beam-forming vector with $D_H \times 1$ dimension; $U_V$ represents a beam-forming vector with $D_V \times 1$ dimension; A represents a diagonal matrix with $D_H \times D_H$ dimension; B represents a diagonal matrix with $D_V \times D_V$ dimension, $D_H$ and $D_V$ represent positive integers; and diag(U) represents a diagonal matrix, derived from a vector U, with elements on the diagonal being equal to elements in the vector U.

14. The UE according to claim 12, wherein the second component pre-coding matrix is a product of a $(2D_H D_V) \times r$ -dimension matrix and a power normalization coefficient, r represents the number of columns in the pre-coding matrix; and the second component pre-coding matrix is:

$$W_2 = \begin{bmatrix} X_V^1 \otimes X_H^1 & \cdots & X_V^r \otimes X_H^r \\ \alpha_1 X_V^1 \otimes X_H^1 & \cdots & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, i=1, . . . , r, $D_H$ and $D_v$ represent positive integers, and M represents the power normalization coefficient.

15. The UE according to claim 12, wherein the first determining device is configured:
to select the first component pre-coding matrix from a set of first component pre-coding matrixes and to determine the first pre-coding indicator corresponding to the selected first component pre-coding matrix, and to select the second component pre-coding matrix from a set of second component pre-coding matrixes and to determine the second pre-coding indicator corresponding to the selected second component pre-coding matrix;
or,
wherein the first determining device is configured:
to determine at least one pre-coding matrix; to determine the first pre-coding indicator and the second pre-coding indicator corresponding to the at least one pre-coding matrix according to a correspondence relationship between the first pre-coding indicator, the second pre-coding indicator and the pre-coding matrix; and to determine that one of the determined first pre-coding indicator and one of the determined second pre-coding indicator are the first pre-coding indicator and the second pre-coding indicator to be transmitted to the network side.

16. The UE according to claim 12, wherein the first determining device is configured to determine that a product of the first component pre-coding matrix and the second component pre-coding matrix is the pre-coding matrix.

17. A network-side device for determining a pre-coding matrix, the network-side device comprising:
a receiving device configured to receive a first pre-coding indicator and a second pre-coding indicator from a UE; and
a second determining device configured to determine a pre-coding matrix corresponding to the first pre-coding indicator and the second pre-coding indicator,
the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two diagonal matrixes, and the second component pre-coding matrix is constructed by beam-rotating vectors, each of the beam-rotating vectors is equal to a Kronecker product of two vectors.

18. The network-side device according to claim 17, wherein the second determining device is configured:
to determine the first component pre-coding matrix corresponding to the first pre-coding indicator, to determine the second component pre-coding matrix corresponding to the second pre-coding indicator and to determine that a product of the first component pre-coding matrix and the second component pre-coding matrix is the pre-coding matrix;

or, wherein the second determining device is configured:
to determine the pre-coding matrix corresponding to the received first pre-coding indicator and second pre-coding indicator according to a preset correspondence relationship between the first pre-coding indicator, the second pre-coding indicator and the pre-coding matrix.

19. The network-side device according to claim 18, wherein the second determining device is configured to determine the first component pre-coding matrix corresponding to the first pre-coding indicator in the equation of:

$$W_1 = \begin{bmatrix} \mathrm{diag}(U_V) \otimes \mathrm{diag}(U_H) & 0 \\ 0 & \mathrm{diag}(U_V) \otimes \mathrm{diag}(U_H) \end{bmatrix};$$

or $$W_1 = \begin{bmatrix} \mathrm{diag}(U_V) \otimes \mathrm{diag}(U_H) & 0 \\ 0 & \mathrm{diag}(U_V) \otimes \mathrm{diag}(AU_H) \end{bmatrix};$$

or $$W_1 = \begin{bmatrix} \mathrm{diag}(U_V) \otimes \mathrm{diag}(U_H) & 0 \\ 0 & \mathrm{diag}(BU_V) \otimes \mathrm{diag}(U_H) \end{bmatrix};$$

or $$W_1 = \begin{bmatrix} \mathrm{diag}(U_V) \otimes \mathrm{diag}(U_H) & 0 \\ 0 & \mathrm{diag}(BU_V) \otimes \mathrm{diag}(AU_H) \end{bmatrix},$$

$W_1$ represents the first component pre-coding matrix; $U_H$ represents a beam-forming vector with $D_H \times 1$ dimension; $U_V$ represents a beam-forming vector with $D_V \times 1$ dimension; A represents a diagonal matrix with $D_H \times D_H$ dimension; B represents a diagonal matrix with $D_V \times D_V$ dimension, $D_H$ and $D_V$ represent positive integers; and diag(U) represents a diagonal matrix, derived from a vector U, with elements on the diagonal being equal to elements in the vector U.

20. The network-side device according to claim 18, wherein the second component pre-coding matrix is a product of a $(2D_H D_V) \times r$ -dimension matrix and a power normalization coefficient, r represents the number of columns in the pre-coding matrix; and
the second component pre-coding matrix is:

$$W_2 = \begin{bmatrix} X_V^1 \otimes X_H^1 & \cdots & X_V^r \otimes X_H^r \\ \alpha_1 X_V^1 \otimes X_H^1 & \cdots & \alpha_r X_V^r \otimes X_H^r \end{bmatrix} M,$$

$W_2$ represents the second component pre-coding matrix; $\alpha_i$ represents a complex scalar with a modulus being 1; $X_V^i$ represents a beam-forming vector with $D_V \times 1$ dimension; and $X_H^i$ represents a beam-forming vector with $D_H \times 1$ dimension, i=1, . . . , r, $D_H$ and $D_V$ represent positive integers, and M represents the power normalization coefficient.

* * * * *